US012675411B2

(12) United States Patent (10) Patent No.: US 12,675,411 B2
Hicks et al. (45) Date of Patent: Jul. 7, 2026

(54) CACHE OPTIMIZATION FOR A REMOTE STORAGE DEVICE

(71) Applicant: INTERNATIONAL BUSINESS MACHINES CORPORATION, Armonk, NY (US)

(72) Inventors: Andrew C. M. Hicks, Highland, NY (US); John S. Werner, Fishkill, NY (US); Christopher V Derobertis, Hopewell Junction, NY (US); Ryan Thomas Rawlins, New Paltz, NY (US); Pasquale A. Catalano, Wallkill, NY (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 18/536,675

(22) Filed: Dec. 12, 2023

(65) Prior Publication Data

US 2025/0190355 A1 Jun. 12, 2025

(51) Int. Cl.
*G06F 12/0877* (2016.01)
*G06F 3/06* (2006.01)
(Continued)

(52) U.S. Cl.
CPC ........ *G06F 12/0877* (2013.01); *G06F 3/0611* (2013.01); *G06F 3/0635* (2013.01);
(Continued)

(58) Field of Classification Search
None
See application file for complete search history.

(56) References Cited

U.S. PATENT DOCUMENTS 7,688,753 B1 * 3/2010 Zimran ................... H04L 67/06
702/182
RE41,958 E 11/2010 Dwarkadas et al.
(Continued)

FOREIGN PATENT DOCUMENTS

JP 2008059315 A * 3/2008 ........... G06F 3/0613

OTHER PUBLICATIONS

Stephen R. Guendert. "FICON and Quality of Service (QoS): Making the Case for True, End-to-End, Host-Managed QOS." Feb./Mar. 2008. z/Journal. pp. 20-28.*
(Continued)

*Primary Examiner* — Nathan Sadler
(74) *Attorney, Agent, or Firm* — Onyx IP Group

(57) ABSTRACT

An apparatus includes a processing device, a network interface configured with a set of channels for communicating data with a target storage unit through a network. The apparatus includes memory, wherein the memory stores computer program instructions that, when executed, cause the processing device to: based on one or more addresses associated with an input/output (I/O) data request, select from the set of channels, a subset of one or more channels from a plurality of subsets of channels having a different associated cache hit probability level, to use to send the I/O data request through a network to a target device having an I/O cache. The processing unit sends, via the network interface, the I/O data request on a channel within the selected subset of one or more channels to access the I/O cache through the network. Associated methods are also disclosed.

20 Claims, 6 Drawing Sheets

(51) Int. Cl.
> G06F 12/0868 (2016.01)
> G06F 12/0888 (2016.01)

(52) U.S. Cl.
> CPC ............ G06F 3/0659 (2013.01); G06F 3/067
> (2013.01); G06F 12/0868 (2013.01); G06F
> 12/0888 (2013.01); *G06F 2212/1021*
> (2013.01); *G06F 2212/154* (2013.01); *G06F*
> *2212/603* (2013.01)

(56) References Cited

U.S. PATENT DOCUMENTS

| | | | |
|---|---|---|---|
| 9,015,399 B2 | 4/2015 | Brewer et al. | |
| 10,073,787 B2 | 9/2018 | Reed et al. | |
| 2009/0292865 A1* | 11/2009 | Hong .................... | G06F 3/0659 |
| | | | 710/22 |
| 2015/0095448 A1* | 4/2015 | Hwang ................... | H04L 67/01 |
| | | | 709/216 |
| 2016/0179387 A1* | 6/2016 | Gaur ..................... | G06F 3/0671 |
| | | | 711/138 |
| 2021/0194959 A1* | 6/2021 | Ogawa ................. | G06F 3/0649 |
| 2024/0281274 A1* | 8/2024 | Yang ....................... | G06F 3/067 |

OTHER PUBLICATIONS

Translation of JP-2008059315-A. 2024.*
Majd et al., "Split-Cache: A Holistic Caching Framework for Improved Network Performance in Wireless Ad Hoc Networks", 2014 IEEE Global Communications Conference, 6 pages.

* cited by examiner

100

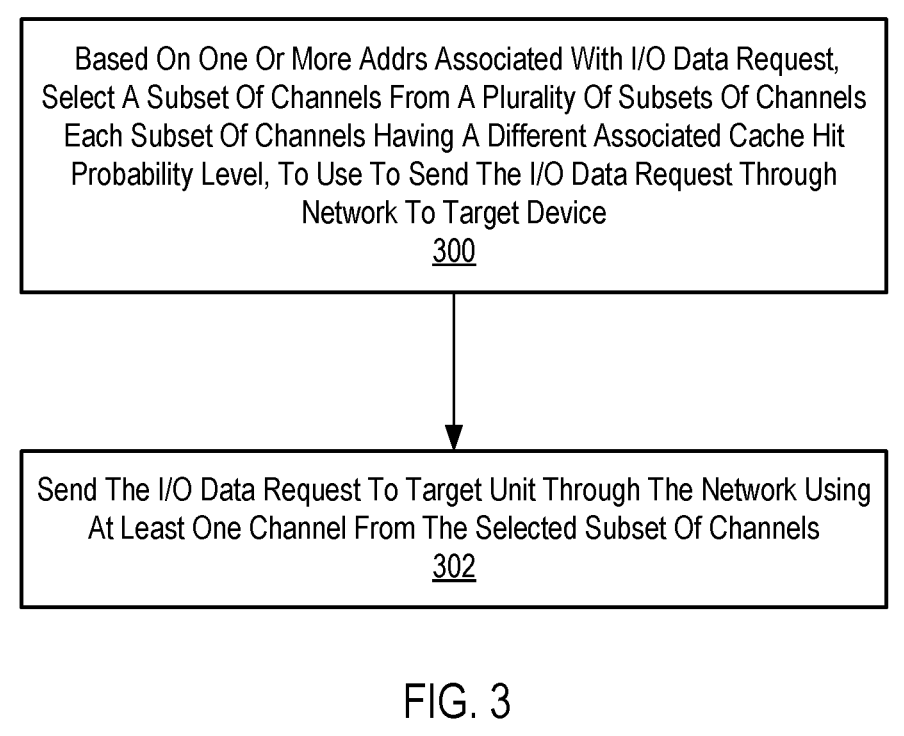

Based On One Or More Addrs Associated With I/O Data Request,
Select A Subset Of Channels From A Plurality Of Subsets Of Channels
Each Subset Of Channels Having A Different Associated Cache Hit
Probability Level, To Use To Send The I/O Data Request Through
Network To Target Device
300

Send The I/O Data Request To Target Unit Through The Network Using
At Least One Channel From The Selected Subset Of Channels
302

FIG. 3

CACHE OPTIMIZATION FOR A REMOTE STORAGE DEVICE

BACKGROUND

The present disclosure relates to methods, apparatus, and products for routing input/output (I/O) data requests between two endpoints over channels through a network.

SUMMARY

According to embodiments of the present disclosure, various methods, apparatus and products for providing remote storage device cache optimization by selecting a channel for communicating through a network with a cache, such as between a host device and a remote storage device that includes a cache, based on cache hit and/or cache miss criteria are described herein. Assuming multiple channels between two communication end points, an apparatus and method allocate a subset of the multiple channels to handle I/O requests that interacts with the same set of data (many cache hits) and another subset for I/O requests that are predicted to have many cache misses. The number of channels in each subset can change dynamically as an amount of I/O requests changes. In some examples, each subset of channels are defined based on a probability level of a cache hit given the current state of the cache and an upcoming I/O request being analyzed. For highly probable cache hits, one subset of channels will be used. If a medium probability is determined then a different subset of channels are used. If a low probability level of a cache hit is predicted then a different subset is defined for that level.

In some aspects, an apparatus includes a processing device, a network interface configured with a set of channels for communicating data with a target storage unit through a network and memory, wherein the memory stores computer program instructions that, when executed, cause the processing device to: based on one or more addresses associated with an input/output (I/O) data request, select from the set of channels, a subset of one or more channels from a plurality of subsets of channels having a different associated cache hit probability level, to use to send the I/O data request through a network to a target device having an I/O cache. The processing unit sends, via the network interface, the I/O data request on a channel within the selected subset of one or more channels to access the I/O cache through the network.

BRIEF DESCRIPTION OF THE DRAWINGS

FIG. 3 sets forth a flowchart of an example process for selecting a channel for communication with a cache through a network based on cache hit and/or cache miss criteria according to aspects of the present disclosure.

DETAILED DESCRIPTION

Unoptimized I/O requests, such as Fibre Channel type requests from a mainframe to remote storage devices, can cause many cache misses which leads to significant performance delays in computing environments. For example, computing systems such as mainframes employ an operating system environment for applications and other services. One type of operating system environment is an IBM z/OS® operating system. In some systems, when the operating system wants to read or write data to a storage device outside the mainframe such as a remote persistent storage device, the operating systems issues I/O data requests via a Fibre Channel (or other types of channels), that include transport control words, that are sent over channels through a host network interface, such as a host bus adapter, through a network to the remote storage device. The remote storage devices, such as hard disk drives and other persistent storage devices have their own cache memory (also referred to as I/O cache) as part of the device. In some systems, the transport control word includes data representing a requestor identifier, an operation type (e.g., read or write), a target device identifier, one or more addresses to be read or written (or a pointer to an address), and status information for the request. The remote storage device processes the received I/O data requests and performs the designated operation type (read or write of data to or from the address) using the I/O cache when the requested data is in the cache or from the persistent storage location when there is a cache miss. The remote storage device updates the status information and sends a response back to the requesting host device with the read data for a read operation or a confirmation that the data was written. However, issuing I/O data requests for remote caches that cause cache misses leads to increased latency in response time, which may lead to application performance impacts.

Figure 1:
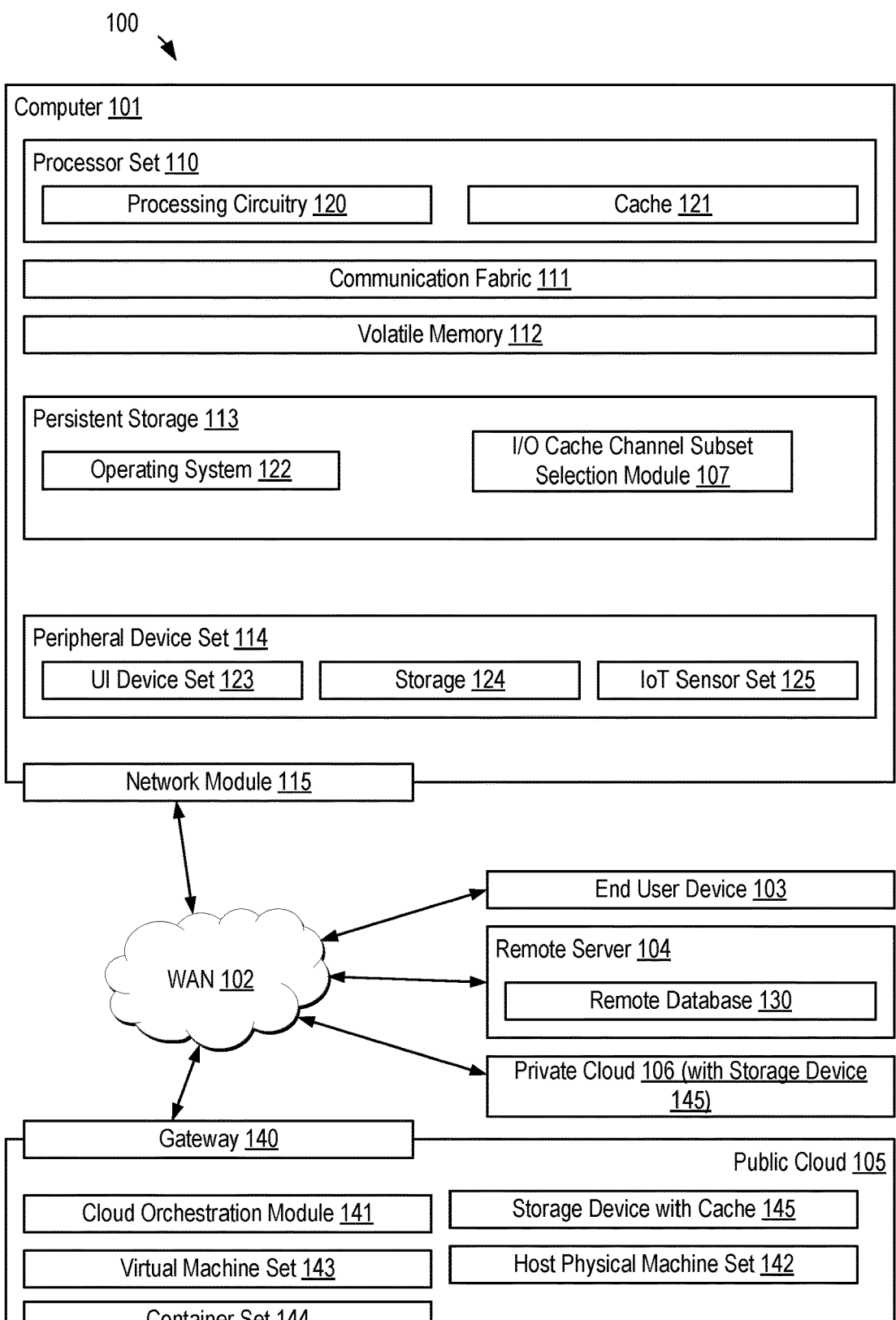
FIG. 1 sets forth an example computing environment according to aspects of the present disclosure.

With reference now to FIG. 1, FIG. 1 sets forth an example computing environment according to aspects of the present disclosure. Computing environment 100 contains an example of an environment for the execution of at least some of the computer code involved in performing the various methods described herein, such as an input/output (I/O) cache channel subset selection module that when executed employs I/O cache directed optimized channels to communicate I/O data requests to an I/O cache in a target unit through a network. In addition to the input/output (I/O) cache channel subset selection module 107, computing environment 100 includes, for example, computer 101, wide area network (WAN) 102, end user device (EUD) 103, remote server 104, public cloud 105, and private cloud 106. In this embodiment, computer 101 includes processor set 110 (including processing circuitry 120 and cache 121), communication fabric 111, volatile memory 112, persistent storage 113 (including operating system 122 and I/O cache channel subset selection module 107, as identified above), peripheral device set 114 (including user interface (UI) device set 123, storage 124, and Internet of Things (IoT) sensor set 125), and network module 115. Remote server 104 includes remote database 130. Public cloud 105 includes gateway 140, cloud orchestration module 141, host physical machine set 142, virtual machine set 143, and container set 144.

Computer 101 may take the form of a desktop computer, laptop computer, tablet computer, smart phone, smart watch or other wearable computer, mainframe computer, quantum computer or any other form of computer or mobile device now known or to be developed in the future that is capable of running a program, accessing a network or querying a database, such as remote database 130. As is well understood in the art of computer technology, and depending upon the technology, performance of a computer-implemented method may be distributed among multiple computers and/ or between multiple locations. On the other hand, in this presentation of computing environment 100, detailed discussion is focused on a single computer, specifically computer 101, to keep the presentation as simple as possible. Computer 101 may be located in a cloud, even though it is not shown in a cloud in FIG. 1. On the other hand, computer 101 is not required to be in a cloud except to any extent as may be affirmatively indicated.

Processor set 110 includes one, or more, computer processors of any type now known or to be developed in the future. Processing circuitry 120 may be distributed over multiple packages, for example, multiple, coordinated integrated circuit chips. Processing circuitry 120 may implement multiple processor threads and/or multiple processor cores. Cache 121 is memory that is located in the processor chip package(s) and is typically used for data or code that should be available for rapid access by the threads or cores running on processor set 110. Cache memories are typically organized into multiple levels depending upon relative proximity to the processing circuitry. Alternatively, some, or all, of the cache for the processor set may be located "off chip." In some computing environments, processor set 110 may be designed for working with qubits and performing quantum computing.

Computer readable program instructions are typically loaded onto computer 101 to cause a series of operational steps to be performed by processor set 110 of computer 101 and thereby effect a computer-implemented method, such that the instructions thus executed will instantiate the methods specified in flowcharts and/or narrative descriptions of computer-implemented methods included in this document. These computer readable program instructions are stored in various types of computer readable storage media, such as cache 121 and the other storage media discussed below. The program instructions, and associated data, are accessed by processor set 110 to control and direct performance of the computer-implemented methods. In computing environment 100, at least some of the instructions for performing the computer-implemented methods, such as by I/O cache channel subset selection module 107 may be stored in a block in persistent storage 113.

Communication fabric 111 is the signal conduction path that allows the various components of computer 101 to communicate with each other. Typically, this fabric is made of switches and electrically conductive paths, such as the switches and electrically conductive paths that make up buses, bridges, physical input/output ports and the like. Other types of signal communication paths may be used, such as fiber optic communication paths and/or wireless communication paths.

Volatile memory 112 is any type of volatile memory now known or to be developed in the future. Examples include dynamic type random access memory (RAM) or static type RAM. Typically, volatile memory 112 is characterized by random access, but this is not required unless affirmatively indicated. In computer 101, the volatile memory 112 is located in a single package and is internal to computer 101, but, alternatively or additionally, the volatile memory may be distributed over multiple packages and/or located externally with respect to computer 101.

Persistent storage 113 is any form of non-volatile storage for computers that is now known or to be developed in the future. The non-volatility of this storage means that the stored data is maintained regardless of whether power is being supplied to computer 101 and/or directly to persistent storage 113. Persistent storage 113 may be a read only memory (ROM), but typically at least a portion of the persistent storage allows writing of data, deletion of data and re-writing of data. Some familiar forms of persistent storage include magnetic disks and solid state storage devices. Operating system 122 may take several forms, such as various known proprietary operating systems or open source Portable Operating System Interface-type operating systems that employ a kernel. The code included in a block of persistent memory for the I/O cache channel subset selection module 107 typically includes at least some of the computer code involved in performing the computer-implemented methods described herein.

Peripheral device set 114 includes the set of peripheral devices of computer 101. Data communication connections between the peripheral devices and the other components of computer 101 may be implemented in various ways, such as Bluetooth connections, Near-Field Communication (NFC) connections, connections made by cables (such as universal serial bus (USB) type cables), insertion-type connections (for example, secure digital (SD) card), connections made through local area communication networks and even connections made through wide area networks such as the internet. In various embodiments, UI device set 123 may include components such as a display screen, speaker, microphone, wearable devices (such as goggles and smart watches), keyboard, mouse, printer, touchpad, game controllers, and haptic devices. Storage 124 is external storage, such as an external hard drive, or insertable storage, such as an SD card. Storage 124 may be persistent and/or volatile. In some embodiments, storage 124 may take the form of a quantum computing storage device for storing data in the form of qubits. In embodiments where computer 101 is required to have a large amount of storage (for example, where computer 101 locally stores and manages a large database), this storage may be provided by peripheral storage devices designed for storing very large amounts of data, such as a storage area network (SAN) that is shared by multiple, geographically distributed computers. IoT sensor set 125 is made up of sensors that can be used in Internet of Things applications. For example, one sensor may be a thermometer and another sensor may be a motion detector.

Network module 115 is the collection of computer software, hardware, and firmware that allows computer 101 to communicate with other computers through WAN 102. Network module 115 may include hardware, such as modems or Wi-Fi signal transceivers, software for packetizing and/or de-packetizing data for communication network transmission, and/or web browser software for communicating data over the internet. In some embodiments, network control functions and network forwarding functions of network module 115 are performed on the same physical hardware device. In other embodiments (for example, embodiments that utilize software-defined networking (SDN)), the control functions and the forwarding functions of network module 115 are performed on physically separate devices, such that the control functions manage several different network hardware devices. Computer readable program instructions for performing the computer-implemented methods can typically be downloaded to computer 101 from an external computer or external storage device through a network adapter card or network interface included in network module 115.

WAN 102 is any wide area network (for example, the internet) capable of communicating computer data over non-local distances by any technology for communicating computer data, now known or to be developed in the future. In some embodiments, the WAN 102 may be replaced and/or supplemented by local area networks (LANs) designed to communicate data between devices located in a local area, such as a Wi-Fi network. The WAN and/or LANs typically include computer hardware such as copper transmission cables, optical transmission fibers, wireless transmission, routers, firewalls, switches, gateway computers and edge servers.

End user device (EUD) 103 is any computer system that is used and controlled by an end user (for example, a customer of an enterprise that operates computer 101), and may take any of the forms discussed above in connection with computer 101. EUD 103 typically receives helpful and useful data from the operations of computer 101. For example, in a hypothetical case where computer 101 is designed to provide a recommendation to an end user, this recommendation would typically be communicated from network module 115 of computer 101 through WAN 102 to EUD 103. In this way, EUD 103 can display, or otherwise present, the recommendation to an end user. In some embodiments, EUD 103 may be a client device, such as thin client, heavy client, mainframe computer, desktop computer and so on.

Remote server 104 is any computer system that serves at least some data and/or functionality to computer 101. Remote server 104 may be controlled and used by the same entity that operates computer 101. Remote server 104 represents the machine(s) that collect and store helpful and useful data for use by other computers, such as computer 101. For example, in a hypothetical case where computer 101 is designed and programmed to provide a recommendation based on historical data, then this historical data may be provided to computer 101 from remote database 130 of remote server 104.

Public cloud 105 is any computer system available for use by multiple entities that provides on-demand availability of computer system resources and/or other computer capabilities, especially data storage (cloud storage) and computing power, without direct active management by the user. In this example a remote storage device 145 with its own local cache, such as persistent memory in the form of a hard disk drive with a local cache that is outside a mainframe computer, is an I/O device that is used by the same entity that operates computer 101. This I/O device is also referred to as a target control unit. Cloud computing typically leverages sharing of resources to achieve coherence and economics of scale. The direct and active management of the computing resources of public cloud 105 is performed by the computer hardware and/or software of cloud orchestration module 141. The computing resources provided by public cloud 105 are typically implemented by virtual computing environments that run on various computers making up the computers of host physical machine set 142, which is the universe of physical computers in and/or available to public cloud 105. The virtual computing environments (VCEs) typically take the form of virtual machines from virtual machine set 143 and/or containers from container set 144. It is understood that these VCEs may be stored as images and may be transferred among and between the various physical machine hosts, either as images or after instantiation of the VCE. Cloud orchestration module 141 manages the transfer and storage of images, deploys new instantiations of VCEs and manages active instantiations of VCE deployments.

Gateway 140 is the collection of computer software, hardware, and firmware that allows public cloud 105 to communicate through WAN 102.

Some further explanation of virtualized computing environments (VCEs) will now be provided. VCEs can be stored as "images." A new active instance of the VCE can be instantiated from the image. Two familiar types of VCEs are virtual machines and containers. A container is a VCE that uses operating-system-level virtualization. This refers to an operating system feature in which the kernel allows the existence of multiple isolated user-space instances, called containers. These isolated user-space instances typically behave as real computers from the point of view of programs running in them. A computer program running on an ordinary operating system can utilize all resources of that computer, such as connected devices, files and folders, network shares, CPU power, and quantifiable hardware capabilities. However, programs running inside a container can only use the contents of the container and devices assigned to the container, a feature which is known as containerization.

Private cloud 106 is similar to public cloud 105, except that the computing resources are only available for use by a single enterprise. In some implementations the private cloud 106 includes the remote storage device 145 with its own local cache, such as persistent memory in the form of a hard disk drive with a local cache that is an I/O device that is used by the same entity that operates computer 101. While private cloud 106 is depicted as being in communication with WAN 102, in other embodiments a private cloud may be disconnected from the internet entirely and only accessible through a local/private network. A hybrid cloud is a composition of multiple clouds of different types (for example, private, community or public cloud types), often respectively implemented by different vendors. Each of the multiple clouds remains a separate and discrete entity, but the larger hybrid cloud architecture is bound together by standardized or proprietary technology that enables orchestration, management, and/or data/application portability between the multiple constituent clouds. In this embodiment, public cloud 105 and private cloud 106 are both part of a larger hybrid cloud.

Figure 2:
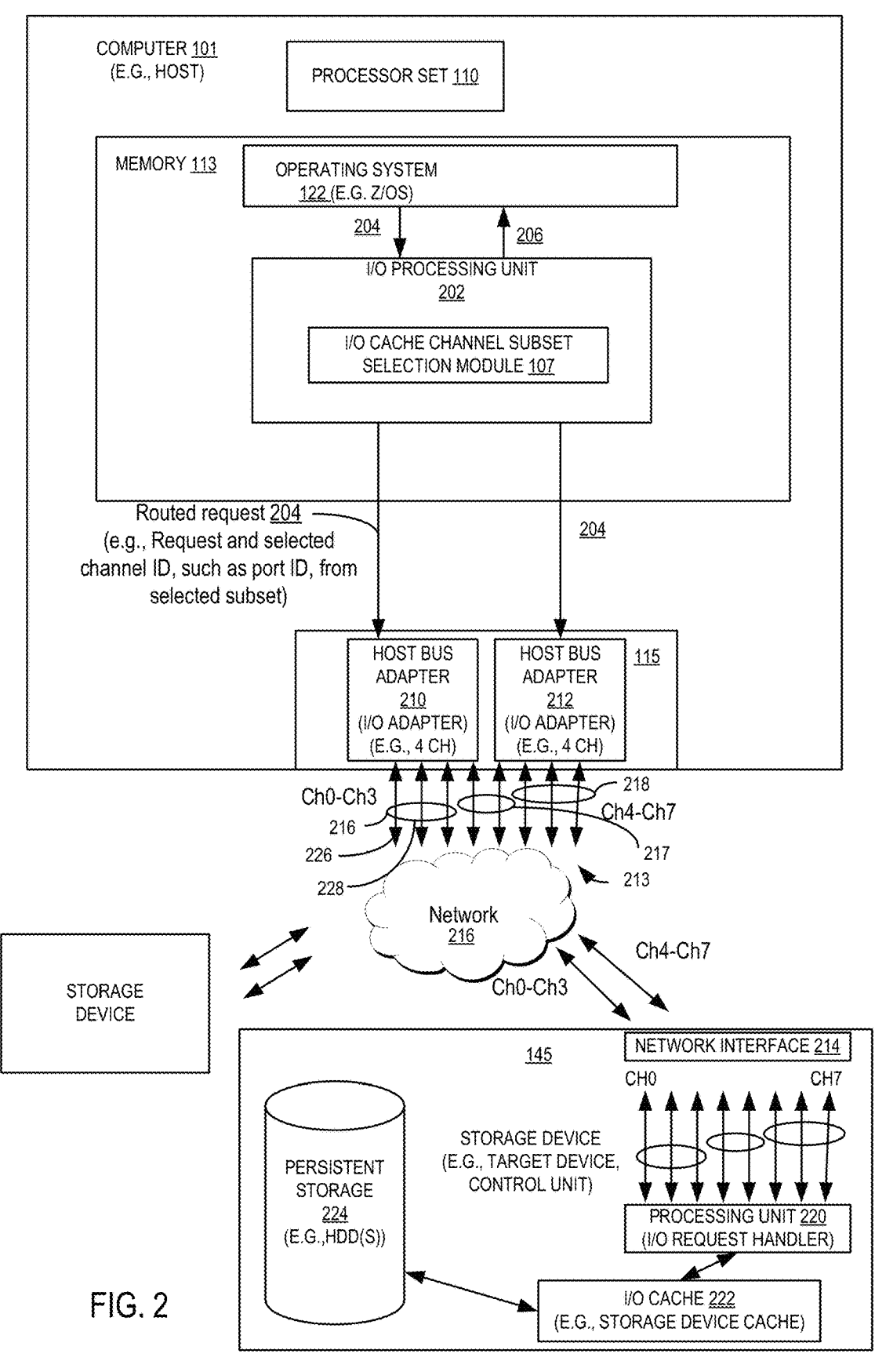
FIG. 2 sets forth another example computing environment according to aspects of the present disclosure.

Referring to FIG. 2, FIG. 2 sets forth an example computing environment 200 according to aspects of the present disclosure. In this example, the computer 101 includes an I/O processing unit 202 that includes the I/O cache channel subset selection module 107. The computer 101 in this example includes as part of the network module 115, network interfaces such as host bus adapter 210 and 212. In this example, the network module 115 includes a hardware network interface that connects a system bus to other network storage devices, such as one or more host bus adapters (HBAs) 210 and 212. The HBAs are hardware network interfaces that may include PCIe cards or other interface adapters that are used to connect to block level storage devices such as Fibre Channel, SATA, NVMe and/or SCSI storage devices. In this example each HBA is shown to control four channels for a set 213 of eight channels. For example, HBA 210 controls channels 0-3 (Ch0-Ch3) and HBA 212 controls channels 4-7 (Ch4-Ch7), however any suitable network interface configuration may be employed.

The I/O processing unit 202 processes upcoming I/O data requests 204 such as read write request to the remote storage device 145, from the operating system 122. The I/O processing unit 202 returns a response 206 to the I/O request 204. It will be recognized that the I/O processing unit operations may be incorporated into the operating system 122 or in any other suitable component as desired.

The remote storage device 145 in this example includes a network interface 214 similar to the network module 115 to allow communications over the set of channels through the network 216 such as a wide area network or any other suitable network. For example, the network interface 214 may also include host bus adapters. The remote storage device 145 includes a processing unit 220 such as central processing unit, that serves as and I/O request handler that performs the operation set forth in the I/O request such as performs a read operation or write operation with and I/O cache 222. If the data for example to be read is not in the I/O cache 222, the processor obtains the data from the persistent memory 224. This would be considered a cache miss. If the data associated with the address in the I/O data request is found in the I/O cache 222, it is considered a cache hit and the processor 220 returns the read data from the remote I/O cache back to the host device in the response 206.

Referring also to FIG. 3, FIG. 3 sets forth a flowchart of an example process for selecting a channel for communication with a cache through a network based on cache hit and/or cache miss criteria according to aspects of the present disclosure. The operations may be performed in any suitable order and by any suitable component, in this example the operations are performed by the I/O cache channel subset selection module 107. As shown in block 300, based on one or more addresses associated with an input/output (I/O) data request 204, a processing unit of processor set 110 selects from the set 213 of channels, a subset of one or more channels from a plurality of subsets of channels 216, 217, 218 having a different associated cache hit probability level, to use to send the I/O data request 204 through the network 216 to the target device, such as remote storage device 145 having an I/O cache 222. As shown in block 302, the processing unit sends the I/O data request on a channel 226 within the selected subset 228 of one or more channels to access the I/O cache 222 through the network. In this example upcoming I/O request 204 is routed along with a channel identifier for Ch0 to the host bus adapter 210 because the channel Ch0 is in the selected subset 228 of the plurality of subsets 216, 217 and 218. The processing unit 220 of the remote storage device 145 processes the sent I/O data request and retrieves cached data from the I/O cache 222 in the target device, such as remote storage device 145, through the network using the channel 226.

In some examples, the target device is not aware of any subset channel control being done by the I/O cache channel subset selection module 107. In other implementations the target device is sent channel control information indicating which channels to keep less active servicing requests from other host computers so that I/O requests with a higher probability of being in the cache 222 as determined by a current host are given priority over certain channel usage compared to other host devices using the target device.

Figure 4:
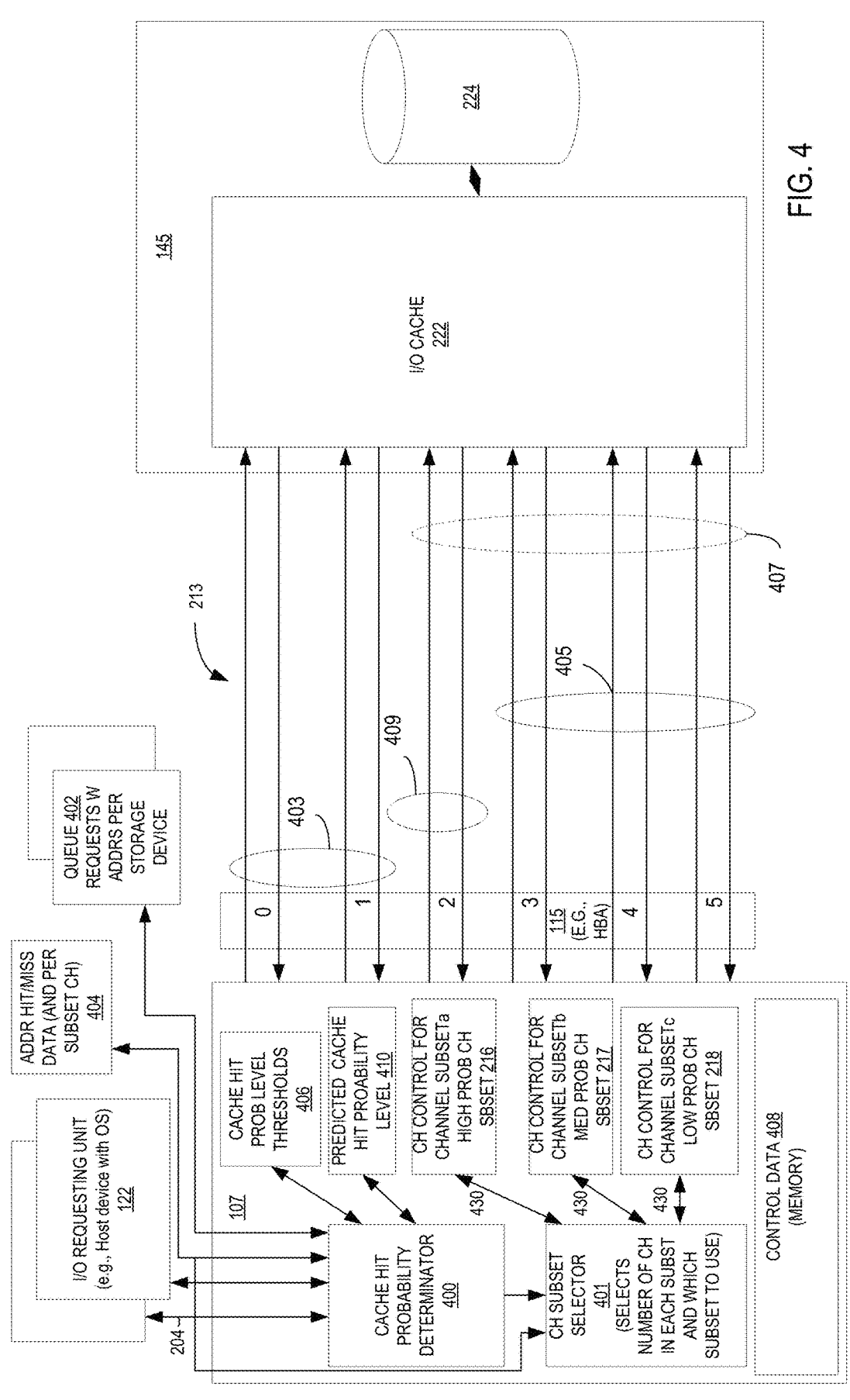
FIG. 4 sets forth an example block diagram of an I/O cache channel subset selection module according to aspects of the present disclosure.

Referring to FIG. 4, FIG. 4 sets forth an example block diagram of an I/O cache channel subset selection module 107 and dynamically changing a number of channels currently assigned to defined subsets according to aspects of the present disclosure. In this example executable code causes the processing unit to operate as a cache hit probability determinator 400 and a channel subset selector 401. In this example, six channels (0-5) are shown as the set 213 of channels and channels 0-1 have been defined for a subset 403 of channels and channels 3-5 have been defined for a subset 405 of channels, and channel 02 has been defined as a subset 409 of channels. Dashed oval 407 represents changing a number of channels currently assigned for subsets 405 to a larger number of channels in the subset. Changing the number of channels currently assigned is based on any suitable factors including for example an amount of traffic that falls within a threshold associated with each subset of channels, a hit rate of addresses communicated by a particular subset of channels, a miss rate of addresses communicated by particular subset of channels, or any other suitable criteria.

In this example, memory such as random access memory of the host device stores, for each remote target device, a queue 402 with entries containing corresponding I/O data requests to be sent and/or that have already be processed by the target device, a data structure containing hit and/or miss data 404 for a list of prior addresses from prior I/O data requests and data representing a predicted cache hit probability level 410 of an upcoming I/O data request 204 to be sent to the target device. It will be recognized that the hit and/or miss data may be included as part of the queue or need not be employed if desired. In this example, only miss data is used, such as, for example, in block 512. In this example, such as, for example, block 514, each I/O data request in each entry of the queue 402 includes data representing a requestor identifier, an operation type (e.g., read or write), a target device identifier, one or more addresses to be read or written (or a pointer to an address), and status information for the request. The queue 402 is a log of the previously processed I/O requests. Items that are newer in the queue have a higher chance of still being in the cache versus older items in the queue. This ordering is used to predict the cache hit/miss rate.

In this example, memory, such as random access memory also stores cache hit probability level thresholds 406 (e.g., values) and programmable control data 408 that defines which channels in the set 213 are in which respective subset of channels and thresholds used to change the number of channels in a subset. These thresholds and control data are initially programmed through for example a user interface or other suitable mechanism. In some implementations, the I/O cache channel subset selection module 107 dynamically changes the control data 408 to change which channels are in each subset and if desired changes the cache hit probability level thresholds 406 as further described below.

Figure 5:
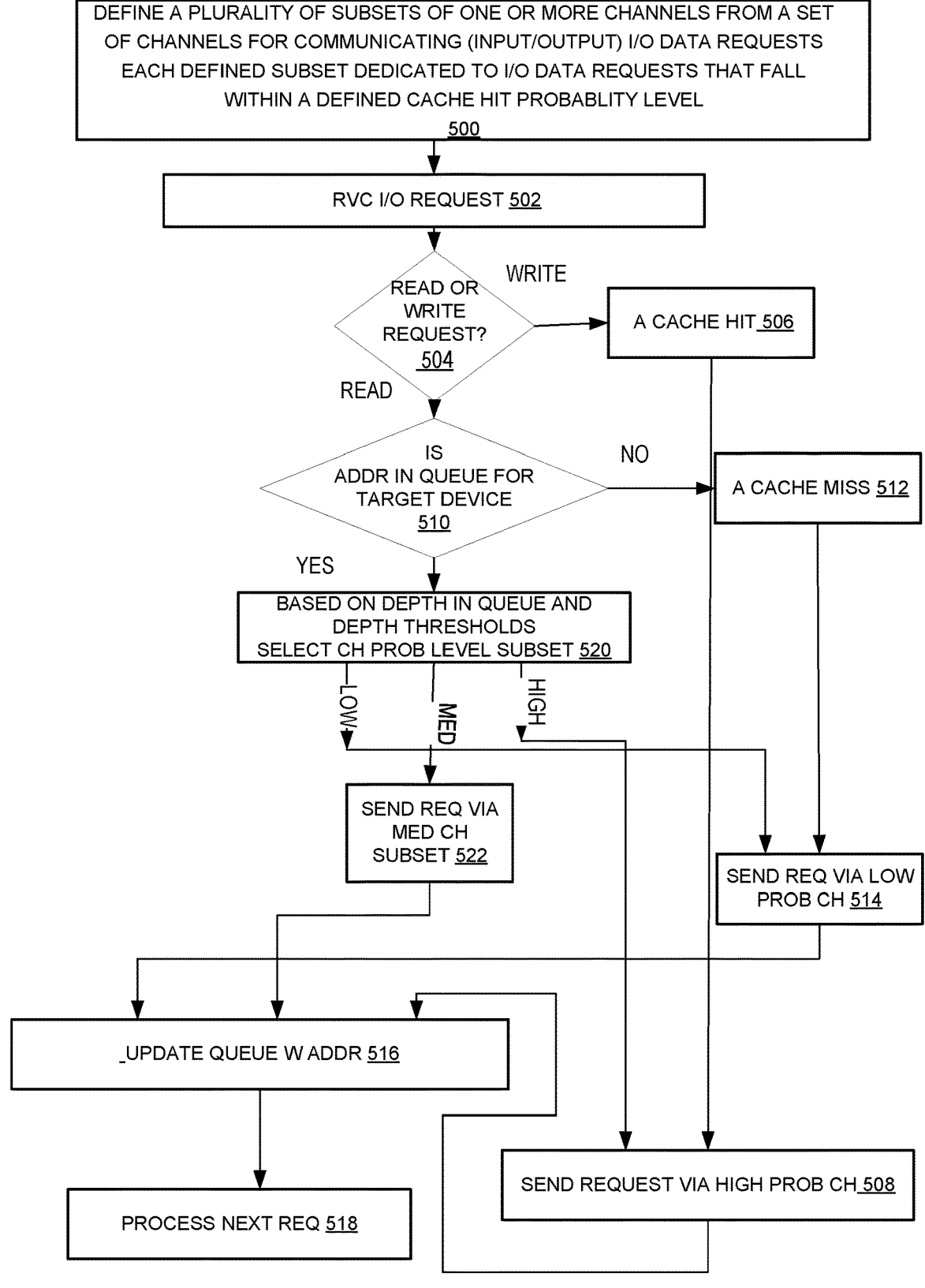
FIG. 5 sets forth a more detailed flowchart of an example process for selecting a channel for communication with a cache through a network based on cache hit and/or cache miss criteria according to aspects of the present disclosure.

Referring also to FIG. 5, FIG. 5 sets forth a more detailed flowchart of an example process for selecting a channel for communication with a cache through a network based on cache hit and/or cache miss criteria according to aspects of the present disclosure. The operations may be performed in any suitable order and by any suitable component, in this example the operations are performed by the I/O cache channel subset selection module 107. As shown in block 500 the process includes defining, such as by the channel subset selector 401, the plurality of subsets of channels 216, 217 and 218 from the set of channels 213 for communicating an I/O data request using one of the different subsets of channels using a defined cache hit probability level, such as a cache hit probability threshold 406, for each subset of the plurality of subsets. The subset of channels to communicate the upcoming I/O data request to the target device is selected based on the predicted I/O cache hit probability level of the I/O data request being within a corresponding defined cache hit probability level for the selected subset of channels. In one example, an upcoming I/O data request is assigned a cache hit probability level through a prediction process and then sent using a channel that is in a subset of channels designated to handle the corresponding cache hit probability level of I/O data requests.

For example, the control data 408 is programmed into memory and defines which subsets of channels are to be used for each cache hit probability level. In one implementation, there are three cache hit probability levels, a high probability, a medium probability and a low probability that the upcoming I/O data request can be sent in for accessing the I/O cache. In one example, there are more channels defined to use for higher level cache hit probability I/O data requests than for lower level probability cache hit I/O data requests. In the example shown in FIG. 4, channels 0-1 have been defined for subset 403 of channels to communicate I/O requests predicted to have a medium cache hit probability level, channels 3-5 have been defined for subset 405 of channels to communicate I/O requests predicted to have a high cache hit probability level, and channel 02 has been defined as a subset 409 of channels to communicate I/O requests predicted to have a low cache hit probability level. However, any suitable grouping of subsets of channels may be employed.

In one example predicting the I/O cache hit probability level for the I/O data request uses a depth level of the address in the request queue 402 and assigning the probability level for the upcoming request based on the depth level of the same address in the queue. For example, a high cache hit probability level is assigned to an upcoming I/O data request if the same address is in the top 10% of the entries (where the most recent requests are at the top of the queue and the oldest are at the bottom), a medium cache hit probability level is assigned to an upcoming I/O data request if the same address is in the middle 11%-25% of the entries, and a low cache hit probability level is assigned to an upcoming I/O data request if the same address is in the bottom 26%-100% of the entries.

In another implementation, the high cache hit probability level, is a range such as 80-100% likelihood that the address of the upcoming I/O data request is in the I/O cache, the medium cache hit probability level, is a range such as 50-79% likelihood that the address of the upcoming I/O data request is in the I/O cache and the low cache hit probability level, is a range such as less than 49% likelihood that the address of the upcoming I/O data request is in the I/O cache. In other implementations, cache directed optimized channel selection is done using I/O cache hit prediction based on a compiler stacking addresses of recurring hits together based on the hit or miss data 404 of prior I/O requests and designating an upcoming I/O data request in a probability level according to a number of hits to the same address over a period of time, probability prediction can also use the I/O request command type to assess probability level (e.g., a write command will get assigned a high probability level) or any other suitable cache hit prediction mechanism.

In some implementations, the cache hit and/or miss data 404, which may be sent in responses from the target device, is used by the channel subset selector 401 to change a number of channels currently assigned within each defined subset of one or more channels. In one example, a hit rate of addresses communicated by a particular subset of channels, and/or a miss rate of addresses communicated by a particular subset of channels is tracked by the channel subset selector 401 and stored as the hit/miss data 404. Programmable channel change thresholds are stored as control data 408. For example, when a subset of channels sends I/O requests that have a level of cache hits that is higher than a hit threshold for that subset one or more channels are added to that subset and taken away from a subset that has misses that are above a miss threshold. In that way, dynamic changes are made to the number of channels in subsets to quickly accommodate more I/O request transactions that have cache hits using more channels.

TABLE I

| Current Channel Subsets | Current Cache Hit Level | Channel Subset Hit Data | Subset Channel Change Threshold |
|---|---|---|---|
| Ch0-1 | Medium | 0 | 20 |
| Ch 02 | Low | 0 | 50 |
| Ch 03-05 | High | 100 | 70 |

For illustration purposes, in TABLE I, since the number of I/O request address hits for the high subset of channels having Ch03-05 have a number of cache hits (100) that exceeds the corresponding channel change threshold (70), not enough channels are being used to send efficient requests. Therefore, the channel subset selector 401 increases the number of channels in the subset 405 by one channel as shown by dashed oval 407 resulting in no low subset so that all medium and low cache hit predicted I/O data requests are sent on Ch0-01. A similar approach is used for cache misses. For example, where a subset has a cache miss level that is too high for a desired miss threshold, a channel from that subset is moved to a subset that has misses below its desired threshold so the inefficient I/O requests are not using too many channels of the set of channels. In this example, the hit/miss data is used in both determining the probability and the bandwidth (number of channels/links) required.

In other implementations, an amount of traffic in each subset is tracked and a number of channels assigned to a subset of channel is changed. For example, the channel subset selector tracks the number of I/O requests sent in each subset and compares the tracked number to a desired maximum traffic threshold. When the amount of traffic for a subset of channels increases beyond the desired maximum traffic threshold a channel is added from another subset of channels in the set whose traffic level is below its desired maximum traffic threshold.

Referring again to FIG. 5, as shown in block 502, the process includes receiving the I/O data request 204, from an operating system or other component. As shown in block 504, the process includes determining whether the received I/O data request is a read or write request. This is done for example by looking at the request type data in the request. If the I/O data request is a write request, as shown in block 506 the I/O data request is predicted to be a cache hit and assigned to the high cache hit probability level. As shown in block 508 the method includes sending the I/O data request via a high probability channel in a high probability subset 405 of channels in this example. For example, the channel subset selector 401 issues channel control information 430 to the channel control circuitry of the HBA to control one of channels 3-5 to send the I/O data request to the target device. In one example, the HBA sends the I/O data request using a next available channel in the subset of channels. For example, if channel 04 is idle, the HBA will send the I/O data request on Ch 04 in the subset 405 of channels. As shown in block 516 the queue 402 is updated with the address from the sent I/O data request that was sent to the target device. As shown in block 518 the process includes processing the next upcoming I/O data request.

Referring back to block 504, when the I/O data request is determined to be a read request, as shown in block 510 the process includes predicting the cache hit probability of the I/O data request by checking the queue 402 for the same address as in the request. As shown in block 520, based on a depth of the same address in the queue and based on one or more depth thresholds the channel subset selector 401 chooses the corresponding subset of channels to communicate the IO data request. In this example, the channel subset selector 401 selects one of the subsets of channels by comparing the predicted I/O cache hit probability level of the address of the I/O data request to each threshold 406 representing a different cache hit probability level for each subset of channels. For example, assuming the address is found to be in the top 20% of the entries in the queue (e.g., in the top 20 entries of a 100 entry queue), the I/O request is compared to the three queue depth threshold levels of: top 10% of the entries is high probability level, middle 11%-25% of the entries is middle probability level, and bottom 26%-100% of the entries is a low probability level, each threshold corresponding to a different subsets of channels.

In this example the predicted cache hit probability level of 20% is within the middle threshold of 11-25% and the I/O data request is assigned a medium cache hit probability level because the address in the request is found in the queue within the medium cache probability level of the 11%-25% range. As shown in block 522, the channel subset selector 401 sends control information 430 to control the medium probability channel subset 403 to communicate the I/O request on channel 0 or one. As shown in block 516 the queue is updated with the address from the sent I/O data request. As shown in block 518 the process continues for the next I/O request. Depending on whether the cache hit probability determinator 400 determines that the I/O data request has a high, medium or low probability that there will be an I/O cache hit, the control data 408 is used to provide the channel control information 430 to the HBA. For example, the control information 430 in some examples is a table identifying which channels are currently assigned to each subset and which channel is available in each subset. In some implementations, the channel availability data is obtained from a register or other mechanism maintained by the HBA. In another embodiment, channel availability data is obtained using Fibre Channel Extended Link Service Read Diagnostic Parameters. The channel subset selector 401 sends the channel control information 430 to the HBA to cause the I/O data request to be routed to the appropriate channel within the subset of channels designated to handle the corresponding I/O data request with the same level of cache hit probability.

Figure 6:
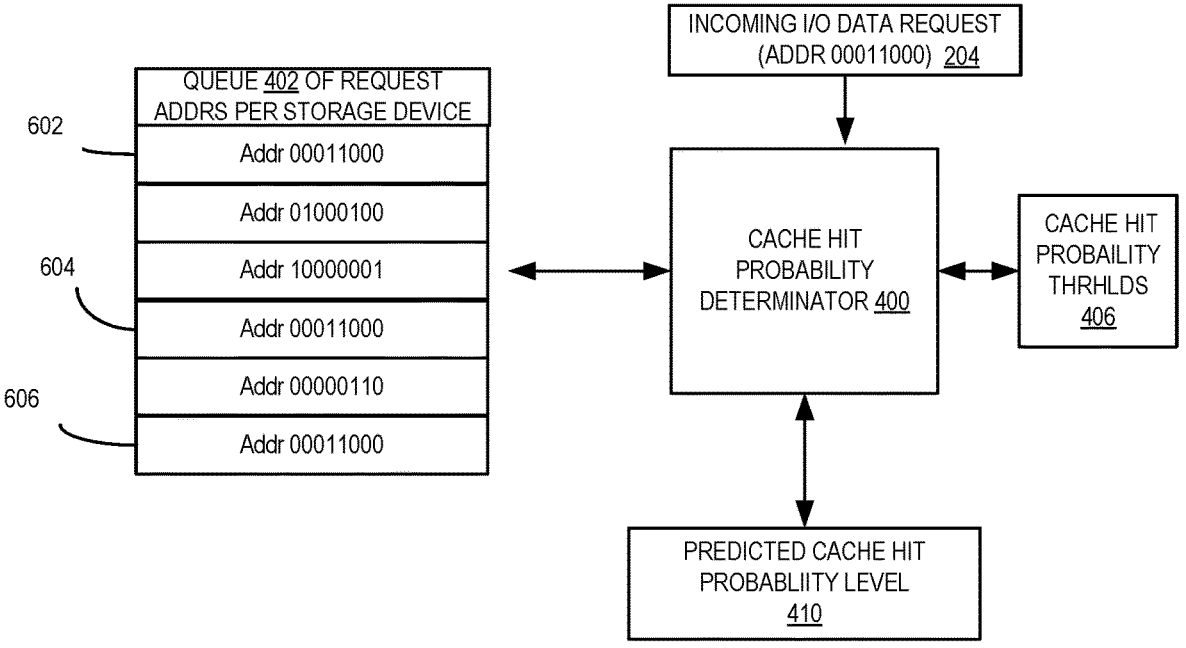
FIG. 6 is an example block diagram of a cache hit probability determinator according to aspects of the present disclosure.

FIG. 6 is an example block diagram of a cache hit probability determinator 400 according to aspects of the present disclosure. In this example, the cache hit probability determinator 400 uses the Q depth mechanism to determine a predicted cache hit probability level 410. In this example the address for the incoming data request is 00011000. In this example the queue 402 is a 64 entry queue. The newest six entries of the queue 402 are shown which are considered to be the top 10% of the queue depth (6/64). The cache hit probability determinator 400 searches the queue for the address in the I/O data request 00011000 and finds three entries 602, 604 and 606 in the most recent six entries of 64 total entries and calculates that the address appears in the top 10% of the queue (it appears at least once in the six entries—6/64). The cache hit probability determinator 400 compares the cache hit probability thresholds 406 to the calculated queue depth percentage and determines that the calculated 10% falls within the 0-10% designation (referenced above) for a high probability and assigns a cache hit probability level 410 of high to the I/O data request 204.

As set forth above, in some implementations, a performance optimization mechanism is disclosed for routing data in a multi-channel communication network between two endpoints. For example, an apparatus, process and product defines a plurality of subsets of one or more channels for I/O requests, each dedicated to I/O requests whose addresses that fall within a defined cache hit percentage range. The process includes predicting a cache hit percentage for an upcoming I/O request and comparing the likelihood percentage to the thresholds for the plurality of subsets of one or more channels. In certain implementations, the process includes identifying a set of channels based on the cache hit percentage being within a threshold and transmitting the data on a channel within the identified subset of channels. Using differing channel subsets to handle different cache hit probability I/O requests can increase the I/O cache access speed for I/O data requests.

Various aspects of the present disclosure are described by narrative text, flowcharts, block diagrams of computer systems and/or block diagrams of the machine logic included in computer program product (CPP) embodiments. With respect to any flowcharts, depending upon the technology involved, the operations can be performed in a different order than what is shown in a given flowchart. For example, again depending upon the technology involved, two operations shown in successive flowchart blocks may be performed in reverse order, as a single integrated step, concurrently, or in a manner at least partially overlapping in time.

A computer program product embodiment ("CPP embodiment" or "CPP") is a term used in the present disclosure to describe any set of one, or more, storage media (also called "mediums") collectively included in a set of one, or more, storage devices that collectively include machine readable code corresponding to instructions and/or data for performing computer operations specified in a given CPP claim. A "storage device" is any tangible device that can retain and store instructions for use by a computer processor. Without limitation, the computer readable storage medium may be an electronic storage medium, a magnetic storage medium, an optical storage medium, an electromagnetic storage medium, a semiconductor storage medium, a mechanical storage medium, or any suitable combination of the foregoing. Some known types of storage devices that include these mediums include: diskette, hard disk, random access memory (RAM), read-only memory (ROM), erasable programmable read-only memory (EPROM or Flash memory), static random access memory (SRAM), compact disc read-only memory (CD-ROM), digital versatile disk (DVD), memory stick, floppy disk, mechanically encoded device (such as punch cards or pits/lands formed in a major surface of a disc) or any suitable combination of the foregoing. A computer readable storage medium, as that term is used in the present disclosure, is not to be construed as storage in the form of transitory signals per se, such as radio waves or other freely propagating electromagnetic waves, electromagnetic waves propagating through a waveguide, light pulses passing through a fiber optic cable, electrical signals communicated through a wire, and/or other transmission media. As will be understood by those of skill in the art, data is typically moved at some occasional points in time during normal operations of a storage device, such as during access, de-fragmentation or garbage collection, but this does not render the storage device as transitory because the data is not transitory while it is stored.

The descriptions of the various embodiments of the present disclosure have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A method comprising:

based on one or more addresses associated with an input/output (I/O) data request, selecting from a set of channels by a processing unit, a subset of one or more channels from a plurality of subsets of channels having a different associated cache hit probability level, to use to send the I/O data request through a network to a target device having an I/O cache;

sending, by the processing unit, the I/O data request on a channel within the selected subset of one or more channels to access the I/O cache through the network;

predicting an I/O cache hit probability level for the I/O data request, wherein predicting the I/O cache hit probability level for the I/O data request comprises using a depth level of the address in a request queue and comparing a predicted I/O cache hit probability level to a threshold, wherein the request queue comprises entries containing corresponding I/O data requests that are to be sent and that have already been processed, and wherein the entries are assigned hit probability levels based on depth levels of addresses, of the corresponding I/O data requests, in the request queue;

selecting the subset of the one or more channels to communicate the I/O data request to the target device based on the predicted I/O cache hit probability level being within a corresponding defined cache hit probability level for the selected subset of channels; and dynamically changing a number of channels currently assigned within the subset of the one or more channels based on at least one of a hit rate of addresses communicated by a subset of channels or a miss rate of addresses communicated by a subset of channels.

2. The method of claim 1, comprising defining the plurality of subsets of one or more channels from the set of channels for communicating the I/O data request into the different associated cache hit probability level using a defined cache hit probability level for each subset of the plurality of subsets.

3. The method of claim 1, comprising dynamically changing the number of channels currently assigned within the subset of the one or more channels based on: an amount of traffic that falls within a threshold associated with each subset of one or more channels, the hit rate of addresses communicated by a subset of channels, and the miss rate of addresses communicated by a subset of channels.

4. The method of claim 1, comprising retrieving cached data from an I/O cache in the target device, through the network using the channel.

5. The method of claim 1, wherein selecting the subset of one or more channels from the plurality of subsets comprises:

comparing the predicted I/O cache hit probability level of the address of the I/O data request to each threshold representing a different cache hit probability level for each subset of channels; and routing the I/O data request to the channel in the subset of channels that accommodates the predicted I/O cache hit probability level.

6. The method of claim 1, wherein a high cache hit probability level is a range of at least 80% likelihood that the address of the upcoming I/O data request is in the I/O cache.

7. The method of claim 1, wherein a medium cache hit probability level is a range of between 50% to 79% likelihood that the address of the upcoming I/O data request is in the I/O cache.

8. The method of claim 1, wherein a low cache hit probability level is a range of below 49% likelihood that the address of the upcoming I/O data request is in the I/O cache.

9. A computer program product comprising a computer readable storage medium, wherein the computer readable storage medium comprises computer program instructions that, when executed:

based on one or more addresses associated with an input/output (I/O) data request, selects from a set of channels, a subset of one or more channels from a plurality of subsets of channels having a different associated cache hit probability level, to use to send the I/O data request through a network to a target device having an I/O cache;

sends the I/O data request on a channel within the selected subset of one or more channels to access the I/O cache through the network;

predicts an I/O cache hit probability level for the I/O data request, wherein predicting the I/O cache hit probability level for the I/O data request comprises using a depth level of the address in a request queue and comparing a predicted I/O cache hit probability level to a threshold, wherein the request queue comprises entries containing corresponding I/O data requests that at least one of: are to be sent or have already been processed, and wherein the entries are assigned hit probability levels based on depth levels of addresses, of the corresponding I/O data requests, in the request queue;

selects the subset of the one or more channels to communicate the I/O data request to the target device based on the predicted I/O cache hit probability level being within a corresponding defined cache hit probability level for the selected subset of channels; and dynamically changes a number of channels currently assigned within the subset of the one or more channels based on at least one of a hit rate of addresses communicated by a subset of channels or a miss rate of addresses communicated by a subset of channels.

10. The computer program product of claim 9, wherein the computer readable storage medium comprises computer program instructions that, when executed:

defines the plurality of subsets of one or more channels from the set of channels for communicating the I/O data request into the different associated cache hit probability level using a defined cache hit probability level for each subset of the plurality of subsets.

11. The computer program product of claim 9, wherein the computer readable storage medium comprises computer program instructions that, when executed:

changes the number of channels currently assigned within the subset of the one or more channels based on: an amount of traffic that falls within a threshold associated with each subset of one or more channels, the hit rate of addresses, or the miss rate of addresses.

12. The computer program product of claim 9, wherein the computer readable storage medium comprises computer program instructions that, when executed:

selects the subset of one or more channels from the plurality of subsets by comparing the predicted I/O cache hit probability level of the address of the I/O data request to each threshold representing a different cache hit probability level for each subset of channels; and routes the I/O data request to the channel in the subset of channels that accommodates the predicted I/O cache hit probability level.

13. The computer program product of claim 9, wherein the computer readable storage medium comprises computer program instructions that, when executed:

retrieves cached data from an I/O cache in the target device, through the network using the channel.

14. An apparatus comprising:

a processing device;

a network interface configured with a set of channels for communicating data with a target storage unit through a network; and memory operatively coupled to the processing device, wherein the memory stores computer program instructions that, when executed, cause the processing device to:

based on one or more addresses associated with an input/output (I/O) data request, select from the set of channels, a subset of one or more channels from a plurality of subsets of channels having a different associated cache hit probability level, to use to send the I/O data request through a network to a target device having an I/O cache;

send, via the network interface, the I/O data request on a channel within the selected subset of one or more channels to access the I/O cache through the network;

predict an I/O cache hit probability level for the I/O data request, wherein predicting the I/O cache hit probability level for the I/O data request comprises using a depth level of the address in a request queue and comparing a predicted I/O cache hit probability level to a threshold, wherein the request queue comprises entries containing corresponding I/O data requests that at least one of: are to be sent or have already been processed, and wherein the entries are assigned hit probability levels based on depth levels of addresses, of the corresponding I/O data requests, in the request queue;

select the subset of the one or more channels to communicate the I/O data request to the target device based on the predicted I/O cache hit probability level being within a corresponding defined cache hit probability level for the selected subset of channels; and dynamically change a number of channels currently assigned within the subset of the one or more channels based on at least one of a hit rate of addresses communicated by a subset of channels or a miss rate of addresses communicated by a subset of channels.

15. The apparatus of claim 14, wherein the memory stores computer program instructions that, when executed, cause the processing device to:

define the plurality of subsets of one or more channels from the set of channels for communicating the I/O data request into the different associated cache hit probability level using a defined cache hit probability level for each subset of the plurality of subsets.

16. The apparatus of claim 14, wherein the memory stores computer program instructions that, when executed, cause the processing device to:

dynamically change the number of channels currently assigned within the subset of the one or more channels based on the hit rate of addresses and the miss rate of addresses, wherein, to change the number of channels, the processing device is to increase the number of channels by adding one or more channels from an additional subset of channels with cache misses that exceed a miss threshold, and wherein the one or more channels are added based on cache hits, of the subset of the one or more channels, exceeding a hit threshold.

17. The apparatus of claim 14, wherein the memory stores computer program instructions that, when executed, cause the processing device to:

retrieve cached data from an I/O cache in the target device, through the network using the channel.

18. The apparatus of claim 14, wherein the memory stores computer program instructions that, when executed, cause the processing device to:

select the subset of one or more channels from the plurality of subsets by comparing the predicted I/O cache hit probability level of the address of the I/O data request to each threshold representing a different cache hit probability level for each subset of channels; and route the I/O data request to the channel in the subset of channels that accommodates the predicted I/O cache hit probability level.

19. The apparatus of claim 18, wherein the memory stores computer program instructions that, when executed, cause the processing device to:

program a threshold corresponding to each different cache hit probability level for each subset of channels that represents a different cache hit probability level for each subset of channels; and select the subset of one or more channels from the plurality of subsets by comparing the predicted I/O cache hit probability level of the address of the I/O data request to each programmed threshold.

20. The apparatus of claim 14, wherein:

a high cache hit probability level is a range of at least 80% likelihood that the address of the upcoming I/O data request is in the I/O cache;

a medium cache hit probability level is a range between 50% to 79% likelihood that the address of the upcoming I/O data request is in the I/O cache; and a low cache hit probability level is a range below 49% likelihood that the address of the upcoming I/O data request is in the I/O cache.

\* \* \* \* \*